(12) United States Patent
Pfaff et al.

(10) Patent No.: US 9,410,811 B2
(45) Date of Patent: Aug. 9, 2016

(54) AUTOMATED GUIDED VEHICLE, SYSTEM COMPRISING A COMPUTER AND AN AUTOMATED GUIDED VEHICLE, METHOD OF PLANNING A VIRTUAL TRACK, AND METHOD OF OPERATING AN AUTOMATED GUIDED VEHICLE

(71) Applicant: KUKA Laboratories GmbH, Augsburg (DE)

(72) Inventors: Patrick Pfaff, Augsburg (DE); Bjorn Klein, Friedberg (DE)

(73) Assignee: KUKA Roboter GmbH, Augsburg (DE)

( * ) Notice: Subject to any disclaimer, the term of this patent is extended or adjusted under 35 U.S.C. 154(b) by 65 days.

(21) Appl. No.: 14/263,165

(22) Filed: Apr. 28, 2014

(65) Prior Publication Data

US 2015/0285644 A1 Oct. 8, 2015

(30) Foreign Application Priority Data

Apr. 30, 2013 (DE) .......................... 10 2013 207 899

(51) Int. Cl.
*G01C 22/00* (2006.01)
*G01C 21/34* (2006.01)
*B25J 9/16* (2006.01)
(Continued)

(52) U.S. Cl.
CPC ............... *G01C 21/34* (2013.01); *B25J 9/1664* (2013.01); *G01C 21/20* (2013.01); *G05D 1/0088* (2013.01); *G05D 1/0217* (2013.01); *G05D 1/0274* (2013.01); *G06Q 10/047* (2013.01); *G05B 2219/31007* (2013.01); *G05B 2219/40298* (2013.01); *G05B 2219/40446* (2013.01); *G05D 2201/0216* (2013.01); *Y02P 90/285* (2015.11)

(58) Field of Classification Search
CPC . G05D 1/0217; G05D 1/0274; G05D 1/0088; G05D 2201/0216; G01C 21/34; G06Q 10/047
USPC ....................................... 701/25, 23, 409, 438
See application file for complete search history.

(56) References Cited

U.S. PATENT DOCUMENTS

2005/0256639 A1 * 11/2005 Aleksic et al. ................ 701/210
2006/0149465 A1    7/2006 Park et al.
(Continued)

FOREIGN PATENT DOCUMENTS

DE         69415067 T2     7/1999
DE     102010012750 A1     9/2011
(Continued)

OTHER PUBLICATIONS

German Patent Office; Search Report in German Patent Application No. 10 2013 207 899.4 dated Mar. 26, 2014; 5 pages.
(Continued)

*Primary Examiner* — Gertrude Arthur Jeanglaud
(74) *Attorney, Agent, or Firm* — Wood, Herron & Evans, LLP (57) ABSTRACT

The invention relates to an automated guided vehicle, a system with a computer and an automated guided vehicle, a method of planning a virtual track and a method of operating an automated guided vehicle. The automated guided vehicle is to move automatically along a virtual track within an environment from a start point to an end point. The environment comprises sections connecting the start point the end point, and the intermediate point. A graph is assigned to the environment.

11 Claims, 6 Drawing Sheets

(51) Int. Cl.
*G05D 1/02* (2006.01)
*G06Q 10/04* (2012.01)
*G05D 1/00* (2006.01)
*G01C 21/20* (2006.01)

(56) References Cited

U.S. PATENT DOCUMENTS

2008/0009965 A1* 1/2008 Bruemmer et al. ........... 700/245
2009/0149202 A1* 6/2009 Hill et al. ................... 455/456.6

FOREIGN PATENT DOCUMENTS

| DE | 102012207269 A1 | 11/2013 |
| EP | 2169502 A1 | 3/2010 |
| EP | 2172825 A1 | 4/2010 |

OTHER PUBLICATIONS

European Patent Office; Search Report in European Patent Application No. 14164709 dated Sep. 17, 2015; 9 pages.

* cited by examiner

AUTOMATED GUIDED VEHICLE, SYSTEM COMPRISING A COMPUTER AND AN AUTOMATED GUIDED VEHICLE, METHOD OF PLANNING A VIRTUAL TRACK, AND METHOD OF OPERATING AN AUTOMATED GUIDED VEHICLE

TECHNICAL FIELD

The invention relates to an automated guided vehicle, a system comprising a computer and an automated guided vehicle, a method of planning a virtual track, and a method of operating an automated guided vehicle.

BACKGROUND

An automated guided vehicle is an automatically controlled floor-mounted vehicle with its own drive. Conventional automated guided vehicles are configured to follow a physical track, line or other markings on the ground. These tracks or markings can be detected using suitable sensors of the automated guided vehicle. This makes it possible for the conventional automated guided vehicle either to follow the track arranged on the ground in the form of a line or to move along from marking to marking. The line is, for instance, arranged on the ground in the form of a colored marking, which, for instance, is detected using cameras of the automated guided transport vehicle.

SUMMARY

The object of the invention is to provide a more flexible operation of an automated guided vehicle.

The object of the invention is achieved by a method for planning a virtual track, along which an automated guided vehicle is able to move automatically within an environment from a start point to an end point, the environment comprising intermediate points and sections connecting the intermediate points, the start point and the end point, the method comprising:

providing a graph assigned to the environment, the graph comprising nodes assigned to the intermediate points, a start node assigned to the start point, an end node assigned to the end point, and edges connecting the start node, the end node and the nodes and being assigned to the corresponding sections, wherein an information about the course of the relevant virtual track section is assigned to each of the edges, the virtual track sections being assigned to the corresponding track sections, automatically planning a path within the graph, the path connecting the start node and the end node, and automatically merging the virtual track sections assigned to the edges of the planned path in order to obtain the virtual track.

The method according to the invention can, for example, be performed directly by the automated guided vehicle. A further aspect of the invention therefore relates to an automated guided vehicle comprising a vehicle base, a plurality of wheels rotatable mounted relative to the vehicle base for moving the automated guided vehicle, at least one drive coupled to at least one of the wheels for driving the corresponding wheel and a control unit coupled to the at least one drive, in which a virtual map of an environment is stored, within which the automated guided vehicle controlled by its control unit is to move automatically from a start point along a virtual track to an end point, the control unit being configured to determine the virtual track according to the inventive method.

The inventive method, however, can also be performed by an external computer. A further aspect of the invention thus relates to a system comprising:

an automated guided vehicle, comprising:
a vehicle base body,
a plurality of wheels rotatable mounted relative to the vehicle base body for moving the automated guide vehicle,
at least one drive coupled to at least one of the wheels to drive the corresponding wheel, and
a control unit connected to the at least one drive, in which a virtual map of an environment is stored, within which the automated guided vehicle controlled by its control unit is to move automatically from a start point along a virtual track to an end point, and
a computer configured to determine the virtual track in accordance with the inventive method and to convey a specification of the determined virtual track to the automated guided vehicle.

The automated guided vehicle is, for example, a mobile robot. The automated guided vehicle realized as a mobile robot can comprise a robotic arm with a plurality of links arranged one after the other, which are connected by means of hinges. The robotic arm can, for example, be attached to the vehicle base. The control unit for moving the wheels can also be configured to move the robotic arm.

Preferably, the automated guided vehicle can be designed as a holonomic or omnidirectional automated guided vehicle. In this case, the automated guided vehicle comprises omnidirectional wheels, preferably so-called Mecanum wheels, which are controlled by the control unit.

According to the inventive method, the graph is provided. According to the invention, the graph is assigned to the environment in which the automated guided is to move from the start point along the virtual track to the end point. The virtual track is required to make this possible and is therefore planned first. This can, for example, take place before every automatic movement, for example, a journey of the automated guided vehicle from the start point to the end point, or take place once, for example, in the context of the start-up procedure of the automated guided vehicle.

In addition to the start point and the end point, the environment comprises the intermediate points, which are connected by the sections. During the automatic movement, the automated guided vehicle moves from the start point through one or more intermediate points and along the corresponding sections. In addition, virtual track sections are assigned to the individual sections.

According to the invention, the nodes of the graph, which is in particular a directed graph, are assigned to the intermediate points and the start node to the start point and the end node to the end point. The edges of the graph are assigned to the individual sections and comprise in each case information about the course of the relevant virtual track section which is assigned to the corresponding section.

According to the invention, a path through the graph is first planned, which path runs from the start node to the end node and, where applicable, through at least one intermediate node and thus comprises the corresponding edges. In order to maintain a suitable path, strategies and algorithms known in principle from graph theory can be used.

Since according to the invention virtual track sections are assigned to the edges, the virtual track can be assembled from the relevant virtual track sections assigned to those edges which are assigned to the path.

After the virtual track has been planned, the automated guided vehicle can move automatically, in particular controlled by its control unit, along the virtual track from the start point to the end point.

To ensure that the automated guided vehicle can move reliably along the virtual track, preferably only those edges are considered during the automatic planning of the path whose assigned virtual track sections the automated guided vehicle is able to move along automatically.

According to a preferred embodiment of the inventive method, the edges comprise information about at least one characteristics of the relevant section, i.e. the section assigned to the relevant edge. The path is preferably planned depending on the information about the at least one characteristic of the corresponding section. The characteristic of the corresponding section is, for example, its length, its minimum width, its minimum height, the maximum permissible overall mass of a vehicle travelling on the corresponding section and/or the maximum permissible speed of a vehicle travelling on the corresponding section. Based on the information about the length of the corresponding section, it is, for example, possible to determine as short a virtual track as possible. In combination with the permissible highest speed, the virtual track can be found which can be travelled along the fastest. Based on the information about the minimum width and/or the minimum height of the corresponding section, a corresponding edge can remain unconsidered in the planning of the path if, based on the width or height of the automated guided vehicle, it is impossible for the automated guided vehicle to pass the corresponding section. The same applies to the maximum permissible overall mass.

According to a further embodiment of the inventive method, the path is planned based on information about the travel behaviour and/or travel ability of the automated guided vehicle. Different automated guided vehicles can have different travel behaviour and/or travel ability. Thus, for example, omnidirectional automated guided vehicles can be more manoeuverable than those with conventional wheels. Depending on the travel behaviour or the travel ability it might be that the corresponding automated guided vehicle is unable to follow a specific virtual track section, so that according to this embodiment the corresponding edge remains unconsidered in the planning of the path.

Possible virtual junctions between the courses of the corresponding virtual track sections may be assigned to the start node, the end node and the individual nodes. Then it can be provided for that the virtual track sections assigned to the edges of the planned path and virtual junctions assigned to the nodes of the planned path are merged to become the virtual track. The resulting virtual track then comprises the corresponding virtual track sections and the virtual junctions.

A further aspect of the invention relates to a method for operating an automated guided vehicle to move automatically within an environment from a point to an end point, comprising:

planning a virtual track, along which the automated guided vehicle is to move automatically from the start point to the end point according to the inventive method, and automatically moving the automated guided vehicle, in particular controlled by a control unit of the automated guided vehicle, along the virtual track from the start point to the end point.

According to an embodiment of the method according to the invention for operating a automated guided vehicle, this may comprise automatically modifying the virtual track during the automatic movement of the automated guided vehicle from the start point to the end point based on the graph and based on detecting that a section still to be travelled along is not able to be travelled along, and automatically moving the automated guided vehicle along the modified virtual track to the end point. If, for example, the automated guided vehicle detects during its automatic movement along the virtual track that a section that it must pass along is impassable, then based on the graph a modified or an updated path can be planned which does not comprise the edges whose assigned section has been detected as impassable and connects the nodes assigned to the current intermediate point to the end node. Then the virtual track sections assigned to the edges of the modified path can be assembled to become the modified virtual track. This embodiment allows for the modification of the virtual track, so that the automated guided vehicle still reaches its end point reliably. The modified path is preferably planned by the automated guided vehicle itself. The modified path, however, can also be planned by means of the computer and, for example, a specification concerning the updated virtual track is transmitted to the automated guided vehicle in particular wirelessly. The so-called current intermediate node is used as the new start node to plan the updated, i.e. modified path. If necessary, provision can be made that, should the automated guided vehicle has already travelled along a part of a virtual track section before it is detected that the corresponding section is impassable, that the automated guided vehicle moves back automatically to the previous intermediate point, in order to move from there along the modified virtual track to the end point. Preferably, the automated guided vehicle moves along the virtual track section already travelled along back to the previous intermediate point.

The virtual track may be planned by the inventive automated guided vehicle or by the inventive system by means of a graph, in particular by means of a directed graph. As a result, preferably, the edges of the graph can be assigned to the sections and the nodes correspond to branch-offs and stopping points (intermediate points). To determine, for example, the shortest and/or most favorable path, a variety of algorithms known to the expert in principle from graph theory, for example, can be applied. These include, for example, the Dykstra algorithm.

Utilizing virtual track guidance a mapping between the virtual tracks existing in reality and the graphic visualization can be produced. Virtual tracks can be subdivided into virtual track sections, which, for example, can also be used in conjunction with a plurality of start-end configurations. This eliminates the redundancy of having to store the entire section for various start-end configurations. Preferably, track sections leading to and leading from a node or intermediate point should be retractable, as, for example, a corresponding curve or junction is defined in the virtual track. If the mapping for the application to be planned is complete, one person, for example, can quickly program new routes and destinations for a driverless transport vehicle by selecting edges and nodes within the framework of the start-up procedure, for example.

For example, in the case of relatively complex systems, it may be useful to support in particular the person who puts the system into operation when designing routes using the system, i.e. the environment. A design along the edges of the graph designed in particular as a directed graph can, for example, serves as a recommendation for the path to be planned. As a result, in addition to the actual section lengths various types of costs can be considered during the design, for example, such as occupancy rate of routes, curvature, etc.

In particular for the lifetime of the system provision can be made for individual edges to be blanked out in the graph, if, for example, an obstacle situation occurs on the corresponding track section. By redesigning the path or paths in the graph the automated guided vehicle or automated guided vehicles are nevertheless able to reach their end points, although the original path runs through a blanked-out track section.

In contrast to the completely localized navigation the virtual track guidance offers the system designers the opportunity to move the automated guided vehicles on the same paths or virtual tracks.

BRIEF DESCRIPTION OF THE DRAWINGS

An exemplary embodiment of the invention is illustrated by way of example in the attached schematic figures.

DETAILED DESCRIPTION

Figure 1:
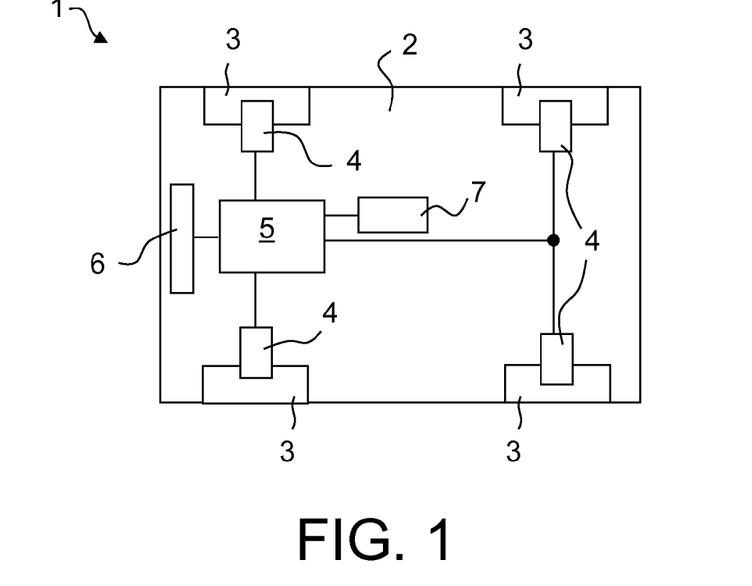
FIG. 1 shows a top view of an automated guided vehicle.
Figure 2:
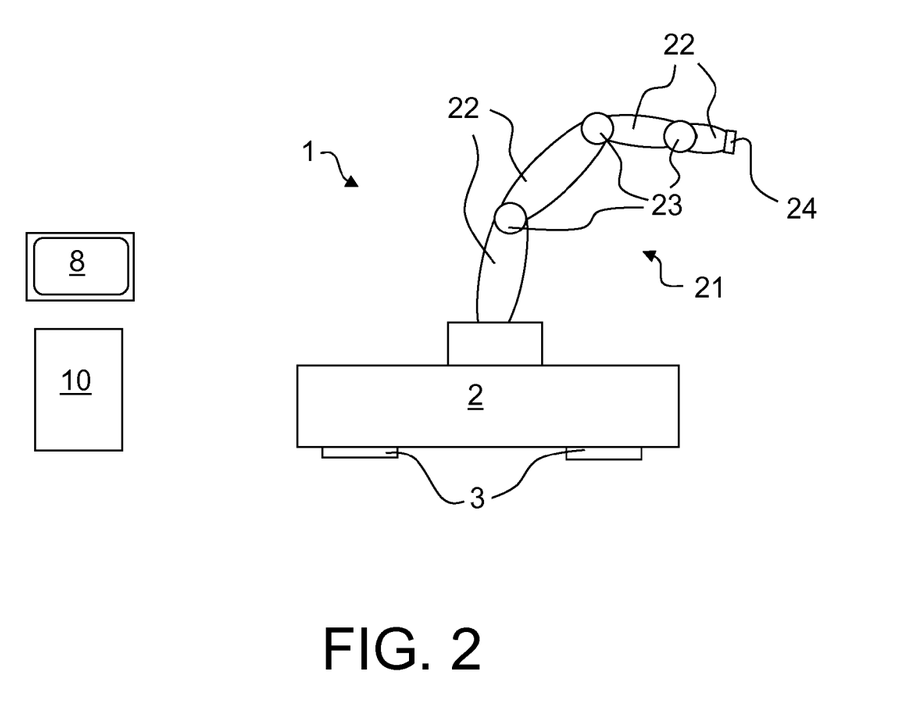
FIG. 2 shows a side view of the automated guided vehicle.

FIG. 1 shows schematically a top view of an automated guided vehicle 1 and FIG. 2 shows a side view of the automated guided vehicle 1.

The automated guided vehicle 1 is preferably designed in such a way that it can be moved freely in all directions. The automated guided vehicle 1 is in particular designed as an omnidirectionally movable and holonomic automated guided vehicle. The automated guided vehicle 1 can be a mobile robot which comprises a robotic arm 21 with a plurality of links 22 arranged one after the other, which are connected using hinges 23. The robotic arm 21 comprises in particular an attachment device, in the form of a flange 24, for example, to which an end effector, not shown in detail, can be attached.

In the case of the present exemplary embodiment, the automated guided vehicle 1 comprises a vehicle base 2 and a plurality of omnidirectional wheels 3, which are also called Mecanum wheels. These wheels comprise, for example, a rotatably positioned wheel rim, on which a plurality of rollers without drive are positioned. The wheel rim can be driven using a drive. In the case of the present exemplary embodiment the wheels 3 are driven in each case using an electric drive 4. These are preferably feedback controlled electric drives.

The automated guided vehicle 1 comprises a control unit 5 arranged on the vehicle base 2, which is connected to the drives 4. If necessary, this can also control the movement of the robotic arm 21, if available.

Figure 3:
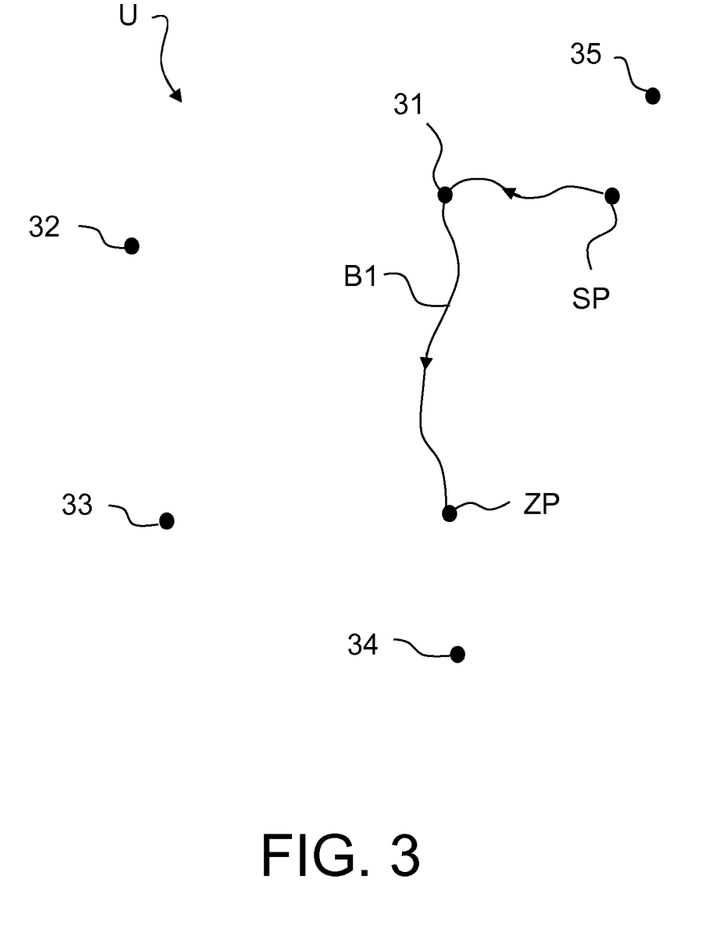
FIGS. 3-5 show an environment for the automated guided vehicle.
Figure 4:
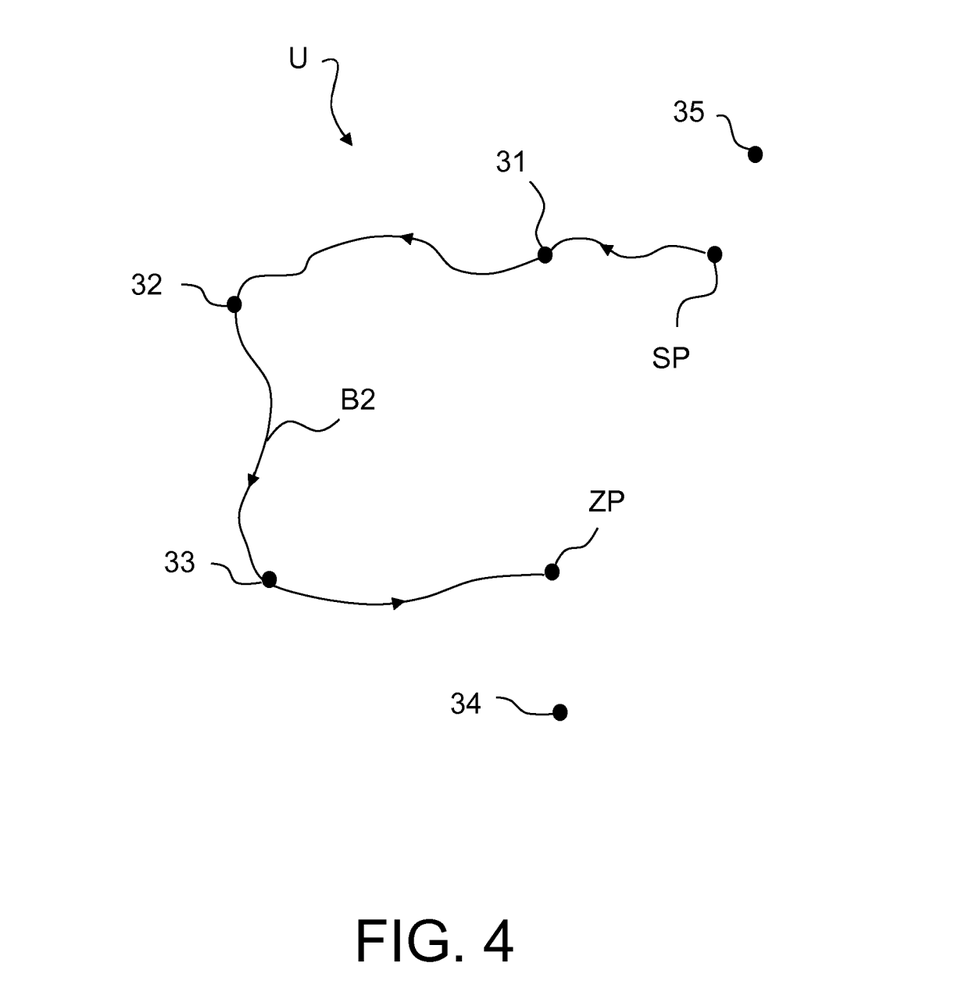
Figure 5:
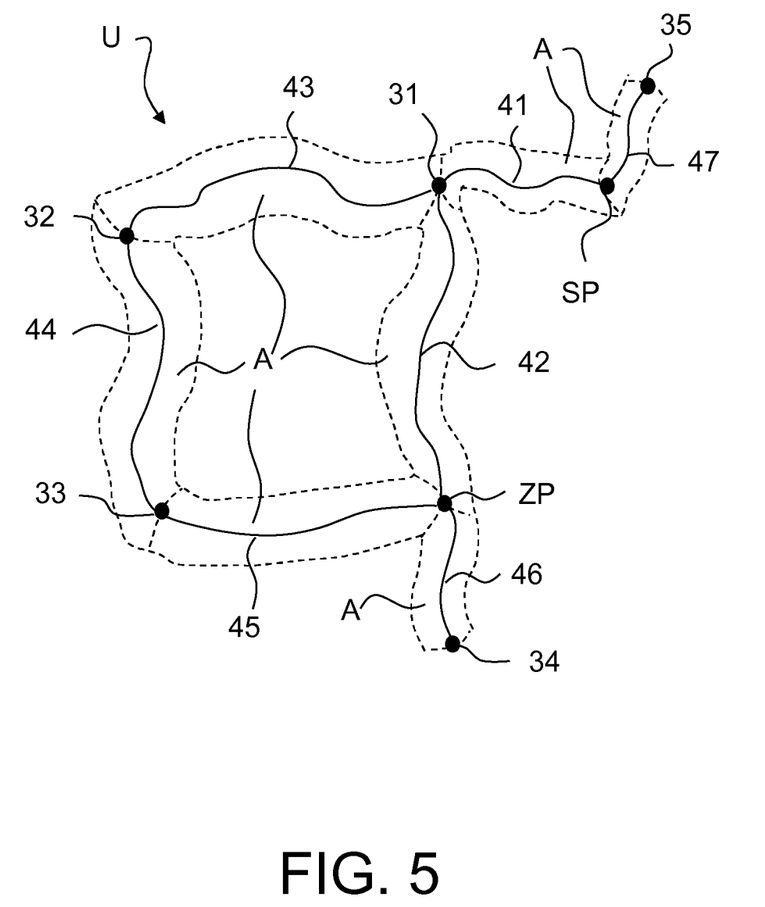

The automated guided vehicle 1 is configured to move automatically in particular from a start point SP to an end point ZP in an environment U shown in FIGS. 3 to 5. In addition, a computer program runs on the control unit 5, which controls the drives 4 in such a way that they move the automated guided vehicle 1 automatically from the start point SP to the end point ZP, for example, along a first virtual track B1 shown in FIG. 3 or a second virtual track B2 shown in FIG. 4.

In the case of the present exemplary embodiment not only are the start point SP and the end point ZP assigned to the environment U, but also a plurality of intermediate points. In the case of the present exemplary embodiment, the intermediate points include a first intermediate point 31, a second intermediate point 32, a third intermediate point 33, a fourth intermediate point 34 and a fifth intermediate point 35.

The intermediate points 31 to 35 are connected by sections A, along which the automated guided vehicle 1 can travel between two intermediate points, if necessary.

In addition, a plurality of virtual track sections are provided between the individual intermediate points 31 to 35 and the start point SP and the end point ZP. A first virtual track section 41 connects the start point SP with the first intermediate point 31, a second virtual track section 42 connects the first intermediate point 31 with the end point ZP, a third virtual track section 43 connects the first intermediate point 31 with the second intermediate point 32, a fourth virtual track section 44 connects the second intermediate point 32 with the third intermediate point 33, a fifth virtual track section 45 connects the third intermediate point 33 with the end point ZP, a sixth virtual track section 46 connects the end point ZP to the fourth intermediate point 34 and a seventh virtual track section 47 connects the start point SP to the fifth intermediate point 35. The virtual track sections 41 to 47 run within the corresponding sections A.

In the case of the present exemplary embodiment, the virtual tracks, along which the automated guided vehicle 1 should move, are generally comprised of a plurality of virtual track sections 41 to 47. In the case of the present exemplary embodiment, the first virtual track B1 comprises the first virtual track section 41 and the second virtual track section 42. The second track B2 comprises the first virtual track section 41, the third virtual track section 43, the fourth virtual track section 44 and the fifth virtual track section 45.

The automated guided vehicle 1 comprises in addition at least one sensor 6 connected to the control unit 5 and, for example, arranged on the vehicle base 2. The sensor or sensors 6 comprises/comprise, for example, at least one laser scanner and/or at least one camera and are provided to record or scan the environment of the automated guided vehicle 1 during its automatic movement or to create images of the environment U of the automated guided vehicle 1. The control unit 5 is configured to process or evaluate the signals or data originating from the sensors 6, for example, by means of image data processing. The at least one sensor 6 comprises, for example, a 2D laser scanner, a 3D laser scanner, a RGB-D camera and/or a ToF camera. ToF cameras are 3D camera systems, which measure distances using the time-of-flight method.

Figure 6:
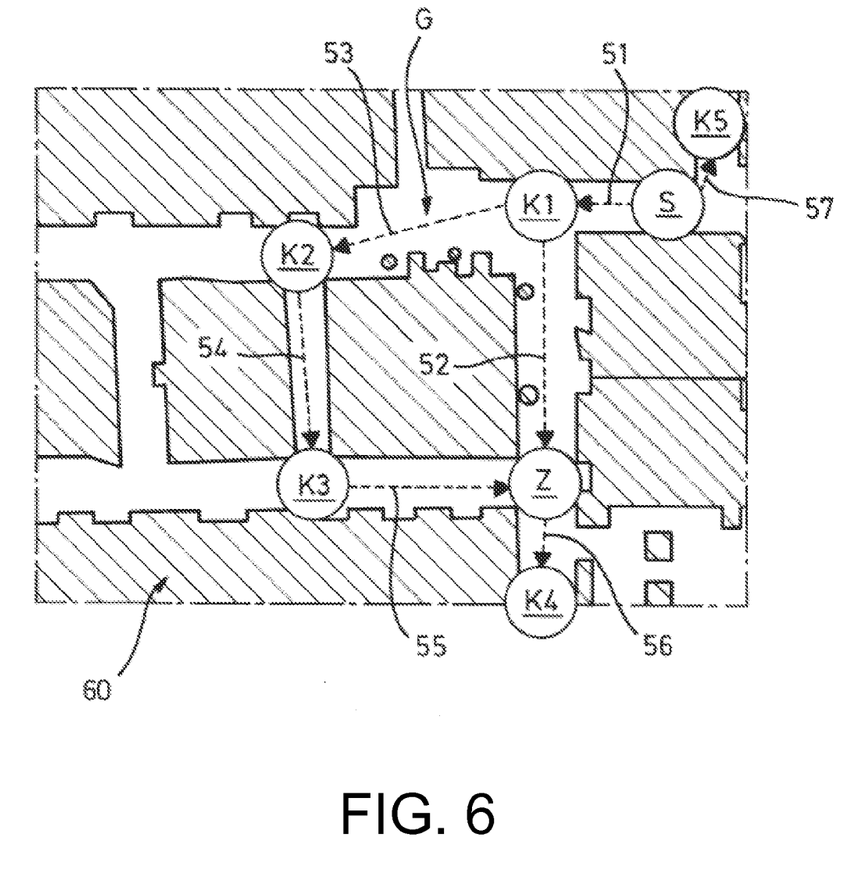
FIG. 6 shows a virtual map and a graph.

As already stated, in the case of the present exemplary embodiment the automated guided vehicle 1 is configured to move automatically from the start point SP to the end point ZP preferably along the first virtual track B1 within the environment U. In addition, in the case of the present exemplary embodiment, a virtual map 60 or a digital map of the environment U in which the automated guided vehicle 1 can move, shown in FIG. 6, is stored in the control unit 5, for example. The environment U is, for example, a hall. The virtual map 60 has been created, for example, by a so-called SLAM method, based, for example, on signals or data of the sensors 6 and/or based on wheel sensors, not illustrated in detail, arranged on the wheels 3. The virtual map 60 is, for example, stored in a memory 7 of the automated guided vehicle 1, which is coupled to the control unit 5. The virtual map 60 can, for example, be illustrated using a display unit 8.

In the case of the present exemplary embodiment provision is made for planning the virtual track along which the automated guided vehicle 1 should move automatically from the start point SP to the end point ZP. The automated guided vehicle 1, for example, performs the planning itself, using, for example, its control unit 5 or a computer program running on its control unit 5. The planning, however, can also be performed, for example, by an external computer 10 or a computer program running on the computer 10, wherein the computer 10 transmits, preferably wirelessly, the results of the planning to the control unit 5.

Figure 7:
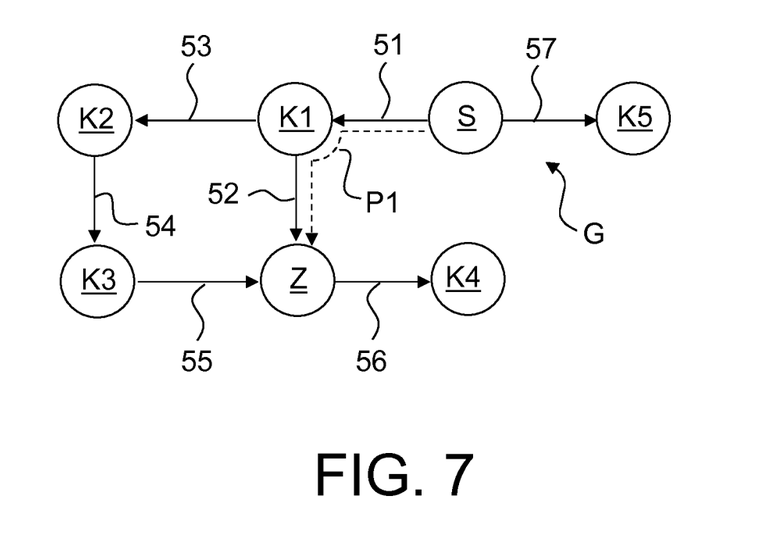
FIGS. 7 and 8 show the graph of FIG. 6.
Figure 8:
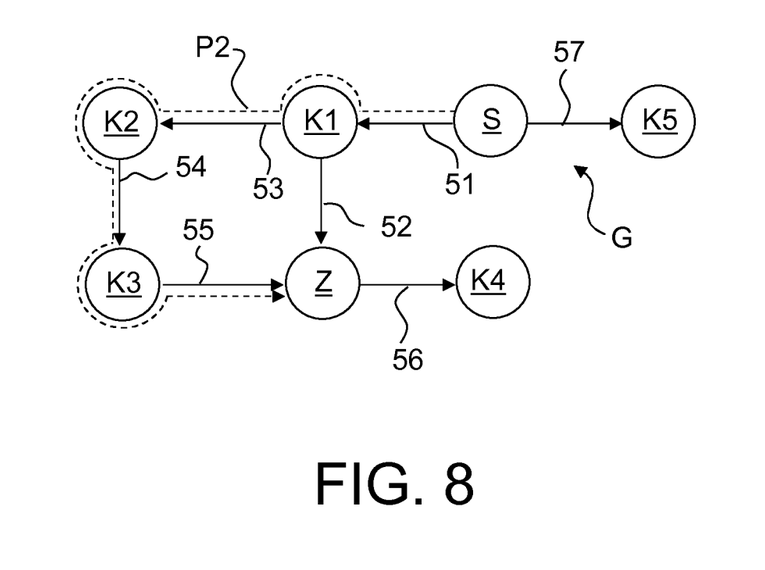

In the case of the present exemplary embodiment the planning is based on a graph G shown in FIGS. 6 to 8. The graph G can, for example, be illustrated together with the virtual map 60 on the display unit 8, as is illustrated in FIG. 6.

The graph G comprises a plurality of nodes and edges connecting the nodes. The graph G comprises in particular a start node S, an end node Z, a first node K1, a second node K2, a third node K3, a fourth node K4 and a fifth node K5. The graph G comprises in particular a first edge 51, a second edge 52, a third edge 53, a fourth edge 54, a fifth edge 55, a sixth edge 56 and a seventh edge 57. In the case of the present exemplary embodiment the first edge 51 connects the start node S to the first node K1, the second edge 52 connects the first node K1 to the end node Z, the third edge 53 connects the first node K1 to the second node K2, the fourth edge 54 connects the second node K2 to the third node K3, the fifth edge 55 connects the third node K3 to the end node Z, the sixth edge 56 connects the end node Z to the fourth node K4 and the seventh edge 57 connects the start node S to the fifth node K5. The graph G is in particular a directed graph G, which is why the edges 51 to 57 are illustrated as arrows in FIGS. 6 to 8.

In the case of the present exemplary embodiment the start node S of the graph G is assigned to the start point SP in the environment U and the end point ZP is assigned to the end node Z. Furthermore, the intermediate points 31 to 35 of the environment U are assigned to the nodes K1 to K5 of the graph G and the virtual track sections 41 to 47 are assigned to the edges 51 to 57. In particular the first intermediate point 31 of the environment U is assigned to the first node K1 of the graph G, the second intermediate point 32 of the environment U is assigned to the second node K2 of the graph G, the third intermediate point 33 of the environment U is assigned to the third node K3 of the graph G, the fourth intermediate point 34 of the environment U is assigned to the fourth node K4 of the graph G and the fifth intermediate point 35 of the environment U is assigned to the fifth node K5 of the graph G. In particular the first virtual track section 41 is assigned to the first edge 51, the second virtual track section 42 is assigned to the second edge 52, the third virtual track section 43 is assigned to the third edge 53, the fourth virtual track section 44 is assigned to the fourth edge 54, the fifth virtual track section 45 is assigned to the fifth edge 55, the sixth virtual track section 46 is assigned to the sixth edge 56 and the seventh virtual track section 47 is assigned to the seventh edge 57.

Thus in the case of the present exemplary embodiment the individual edges 51 to 57 comprise in each case information about the virtual track section 41 to 47 assigned to them. This information can be assigned in the form of attributes to the individual edges 51 to 57.

In the case of the present exemplary embodiment the information about the corresponding virtual track section 41 to 47 comprises in particular information about the course of the corresponding virtual track section 41 to 47. Additional information about the corresponding virtual track sections 41 to 47 can, for example, be information about the minimum width and/or minimum height and/or the length of the sections A assigned to the corresponding virtual track sections 41 to 47. Additional information can also be a specification concerning the maximum permissible speed, at which the corresponding section A may be travelled along, and/or a specification concerning a maximum permissible overall mass, which the automated guided vehicle 1 may have when loaded, in order to be permitted to travel on the corresponding section A. A length of the corresponding section A can also be filed as information.

In the case of the present exemplary embodiment potential junctions, curves for example, between the courses of the corresponding virtual track sections 41 to 47 are assigned to the start node S, the end node Z and the individual nodes K1 to K5.

In the case of the present exemplary embodiment the virtual track along which the automated guided vehicle 1 should move is also planned according to information on the corresponding automated guided vehicle 1, such as its overall mass, maximum height and/or a specification concerning its speed, for example.

Based on the information accessible to the control unit 5 or the computer 10, it is possible for this to plan, also under additional limiting conditions by means of the graph G, if possible, one or a plurality of paths within the graph G which are assigned to possible virtual track sections along which the automated guided vehicle 1 can move automatically from the start point SP to the end point ZP. In the case of the present exemplary embodiment it is possible, based on the information assigned to the edges 51 to 57 and the nodes S, Z and K1 to K5 concerning the courses of the virtual track sections 41 to 46 and the properties of the corresponding sections A, as well as the specification concerning the automated guided vehicle 1, to plan a first path P1 and a second path P2 between the start node S and the end node Z, whose assigned virtual track sections (the first virtual track B1 is assigned to the first path P1 and the second virtual track B2 is assigned to the second path P2) and the corresponding sections A are planned in such a way that it is possible for the automated guided vehicle 1 to travel automatically from the start point SP to the end point ZP.

The planning of the virtual track can in addition also be based on further limiting conditions, so that, for example, the virtual track should be as short as possible or that it should be made in such a way that the automated guided vehicle 1 gets from the start point SP to the end point ZP as quickly as possible.

In order to plan, for example, the shortest virtual track between the start point SP and the end point ZP graph theory algorithms known in principle to the expert can be used, such as the Dykstra algorithm, for example. The shortest virtual track is in the case of the present exemplary embodiment the first virtual track B1.

After the virtual track has been planned, the first virtual track B1, for example, the automated guided vehicle 1 moves automatically along the planned first virtual track B1 from the start point S to the end point Z. This planning can be recalculated before every movement, for example, or once, for example, in the context of the start-up procedure of the automated guided vehicle 1.

If it is not possible, for example, for the automated guided vehicle 1 to be able to travel on the section A assigned to the second virtual track section 42 because, for example, the automated guided vehicle 1 is too wide for the corresponding section A or the manoeuverability of the automated guided vehicle is too small for the course of the second virtual track section 42, then the control unit 5 or the computer 10 do not plan the first virtual track B1 but the second virtual track B2 as the virtual track planned for the automatic movement of the automated guided vehicle 1 from the start point SP to the end point ZP.

In the case of the present exemplary embodiment provision can be made, for example, during the start-up procedure or even during the operation of the automated guided vehicle 1 for one person to modify the graph G by, for example, removing one or a plurality of edges. If, for example, one section A is closed off, then the corresponding edge of the graph G can be removed. This can be done automatically or manually.

In the case of the present exemplary embodiment provision can be made for the planned virtual track to be modified while the automated guided vehicle 1 is moving automatically along it. If, for example, the automated guided vehicle 1, during its movement, for example, through evaluation of the signals of the sensors 6, detects that one section A which the automated guided vehicle 1 is supposed to move along, is impassable, then provision can be made for a replanning of the virtual track. This can be performed by the computer 10 or by the control unit 5. If necessary, the automated guided vehicle 1 travels back to the intermediate point it passed most recently. Preferably, the automated guided vehicle 1 moves along the virtual track or part of the virtual track already travelled back to the previous intermediate point.

What is claimed is:

1. A method for planning a virtual track, along which an automated guided vehicle is to move automatically within an environment from a start point to an end point, the environment comprising intermediate points and sections connecting the intermediate points, the start point and the end point, the method comprising:
   providing a graph assigned to the environment, the graph comprising nodes assigned to the intermediate points, a start node assigned to the start point, an end node assigned to the end point, and edges connecting the start node, the end node and the nodes, and being assigned to the corresponding sections, wherein information about the course of the relevant virtual track section is assigned to each of the edges, the relevant virtual track section being assigned to the corresponding sections of the environment, wherein the course of the relevant virtual track section is how the virtual track section changes with progress along the virtual track section,
   automatically planning a path within the graph, the path connecting the start node and the end node, and
   automatically merging virtual track sections assigned to the edges of the graph that are associated with the planned path in order to obtain the virtual track.

2. The method according to claim 1, in which the only edges considered in automatically planning the path are those associated with virtual track sections that the automated guided vehicle is able to move along automatically.

3. The method according to claim 1, wherein information on at least one characteristic of the relevant section is assigned to the edges, the path being planned depending on the information on the at least one characteristic of the relevant section.

4. The method according to claim 3, in which the characteristic of the corresponding section comprises at least one of: a length of the relevant section, a minimum width of the relevant section, a minimum height of the relevant section, the maximum permissible total mass of a vehicle travelling on the relevant section, or the maximum permissible speed of a vehicle travelling on the relevant section.

5. The method according to claim 1, wherein planning the path is based on information about at least one of: the travel behaviour or the travel ability of the automatic guided vehicle.

6. The method according to claim 1, wherein possible virtual junctions between the courses of the corresponding virtual track sections are assigned to the start node, the end node and the individual nodes, the method further comprising automatically merging the virtual track sections assigned to the edges of the planned path and the relevant virtual junctions assigned to the nodes of the planned path in order to obtain the virtual track.

7. The method according to claim 1, further comprising determining the virtual track based on at least one constraint.

8. A method of operating an automated guided vehicle, configured to move automatically within an environment from a start point to an end point, comprising:
   planning a virtual track, along which the automated guided vehicle should move automatically from the start point to the end point according to the method of claim 1, and
   automatically moving the automated guided vehicle along the virtual track from the start point to the end point.

9. The method according to claim 8, further comprising:
   automatically modifying the virtual track during the automatic movement of the automated guided vehicle from the start point to the end point based on the graph and based on detecting that a section to be driven on is impassable, and
   automatically moving the automated guided vehicle along the modified virtual track to the end point.

10. An automated guided vehicle, comprising:
    a vehicle base body,
    a plurality of wheels rotatable mounted relative to the vehicle base body for moving the automated guided vehicle,
    at least one drive coupled to at least one of the wheels to drive the corresponding wheel, and
    a control unit connected to the at least one drive, in which a virtual map of an environment is stored, within which the automated guided vehicle controlled by its control unit is to move automatically from a start point along a virtual track to an end point, the environment comprising intermediate points and sections connecting the intermediate points, the start point and the end point, the control unit being configured to plan the virtual track, whereby the control unit includes program code stored on a non-transitory machine readable storage medium that, when executed by the control unit, causes the control unit to:
        provide a graph assigned to the environment, the graph comprising nodes assigned to the intermediate points, a start node assigned to the start point, an end node assigned to the end point, and edges connecting the start node, the end node and the nodes, and being assigned to the corresponding sections, wherein information about the course of the relevant virtual track section is assigned to each of the edges, the relevant virtual track section being assigned to the corresponding sections of the environment, wherein the course of the relevant virtual track section is how the virtual track section changes with progress along the virtual track section,
        automatically plan a path within the graph, the path connecting the start node and the end node, and
        automatically merge virtual track sections assigned to the edges of the graph that are associated with the planned path in order to obtain the virtual track.

11. A system, comprising:
    an automated guided vehicle, comprising:
      a vehicle base body,
      a plurality of wheels rotatable mounted relative to the vehicle base body for moving the automated guide vehicle,
      at least one drive coupled to at least one of the wheels to drive the corresponding wheel, and a control unit connected to the at least one drive, in which a virtual map of an environment is stored, within which the automated guided vehicle controlled by its control unit is to move automatically from a start point along a virtual track to an end point, the environment comprising intermediate points and sections connecting the intermediate points, the start point and the end point, and a computer configured to determine the virtual track and to convey a specification of the determined virtual track to the automated guided vehicle, whereby the computer includes program code stored on a non-transitory machine readable storage medium that, when executed by the computer, causes the computer to:

provide a graph assigned to the environment, the graph comprising nodes assigned to the intermediate points, a start node assigned to the start point, an end node assigned to the end point, and edges connecting the start node, the end node and the nodes, and being assigned to the corresponding sections, wherein information about the course of the relevant virtual track section is assigned to each of the edges, the relevant virtual track section being assigned to the corresponding sections of the environment, wherein the course of the relevant virtual track section is how the virtual track section changes with progress along the virtual track section, automatically plan a path within the graph, the path connecting the start node and the end node, and automatically merge virtual track sections assigned to the edges of the graph that are associated with the planned path in order to obtain the virtual track.

* * * * *